United States Patent [19]
Zhang

[11] Patent Number: 5,353,380
[45] Date of Patent: Oct. 4, 1994

[54] APPROXIMATE REASONING APPARATUS

[75] Inventor: Hongmin Zhang, Sunnyvale, Calif.

[73] Assignee: APT Corporation, Kyoto, Japan

[21] Appl. No.: 47,367

[22] Filed: Apr. 19, 1993

Related U.S. Application Data

[63] Continuation of Ser. No. 684,261, Apr. 11, 1991, abandoned.

[30] Foreign Application Priority Data

Apr. 17, 1990 [JP] Japan .................................. 2-101454
Apr. 17, 1990 [JP] Japan .................................. 2-101455

[51] Int. Cl.$^5$ .............................................. G06F 9/44
[52] U.S. Cl. ......................................... 395/3; 395/51; 395/900
[58] Field of Search ........................ 395/3, 61, 900, 51

[56] References Cited

U.S. PATENT DOCUMENTS 4,860,213 8/1989 Bonissone .............................. 395/61
4,860,214 8/1989 Matsuda et al. ...................... 395/61

FOREIGN PATENT DOCUMENTS 378689 7/1990 European Pat. Off. .
390177 10/1990 European Pat. Off. .
468530 1/1992 European Pat. Off. .
4121453 9/1992 Fed. Rep. of Germany .

OTHER PUBLICATIONS

Chuen Chien Lee, "Fuzzy Logic in Control Systems: Fuzzy Logic Controller-Part 1," IEEE Transactions on Systems, Man, and Cybernetics, vol. 20 No. 2, Mar.-/Apr. 1990, pp. 404–418.

Loftri A. Zadeh, "Fuzzy Logic," IEEE Computer, Apr. 1988, pp. 83–93.

Janusz Kacprzyk et al, "An Interactive User-Friendly Decision Support System for Consensus Reaching Based on Fuzzy Logic with Linguistic Quantifiers," Fuzzy Computing, Gupta et al (ed.) 1988, Elsevier Sci Pub, pp. 307–322.

*Primary Examiner*—Allen R. MacDonald
*Attorney, Agent, or Firm*—Dickstein, Shapiro & Morin

[57] ABSTRACT

An approximate reasoning apparatus converts input data into a degree of membership by a membership function, obtains an information quantity for each of a number of factors using the degree of membership, and obtains the possibility of a conclusion using the degree of membership and the information quantities. As a result, the accuracy of an information quantity which prevails at the moment data is entered is taken into consideration to obtain results of reasoning having a high identification capability. Further, a static information quantity of each factor is calculated, the clarity of each factor is obtained from the static information quantity, the clarity of a factor for which data has been entered is calculated from the clarity of each factor, and the finally calculated clarity is displayed as clarity regarding results of reasoning. This makes it possible to judge the reliability of the results of reasoning from the displayed clarity.

3 Claims, 5 Drawing Sheets

FACTOR f1

FACTOR f2

APPROXIMATE REASONING APPARATUS

This application is a continuation of application Ser. No. 07/684,261, filed Apr. 11, 1991, now abandoned.

BACKGROUND OF THE INVENTION

1. Field of the Invention:

This invention relates to an approximate reasoning apparatus as well as a clarity output apparatus for computing information quantities of individual factors and outputting clarity obtained from such information quantities.

2. Description of the Related Art:

Approximate reasoning in a method of correcting or altering the results of reasoning depending upon an information quantities of factors used in order to derive the results of reasoning is known. (For example, see "AN EXPERT SYSTEM WITH THINKING IN IMAGES", by Zhang Hongmin, Preprints of Second IFSA Congress, Tokyo, Jul. 20-25, 1987, p. 765.)

This approximate reasoning method involves using a membership function given for every conclusion relative to a factor to calculate the information quantity of every factor ( i.e., the information identifying capability of a factor), and correcting or altering the results of reasoning (namely the possibility that a conclusion will hold) depending upon information quantities of factors used in order to derive the conclusion (wherein the correction or alteration involves taking the product of possibility and information quantity), thereby improving the capability to identify the results of reasoning.

With this method, however, the information quantity of a factor used is an average information quantity that is a fixed value obtained by computation for every factor. Consequently, even if data is inputted in an area where the identification capability of a membership function is high, possibility, which is the result of reasoning, is low in a case where the average information quantity is low, and therefore the identification capability of the results of reasoning is reduced.

Further, in the conventional method described above, the average information quantity, which is a fixed value obtained by computation for every factor, is not expressed to the user clearly as an information quantity of a factor. As a consequence, the clarity (reliability) of the results of reasoning with regard to a factor to which the inputted data belongs is unknown. For example, even in a case where reasoning is performed using some of the factors (i.e., by inputting data regarding these factors) among those usable to derive a conclusion, it cannot be judged whether or not other factors should be used additionally and whether reasoning should be executed again or not.

SUMMARY OF THE INVENTION

Accordingly, an object of the present invention is to raise identification capability, whenever data is inputted, by calculating the information quantity of a factor in accordance with the inputted data.

Another object of the present invention is to display the clarity of results of reasoning along with these results, thereby facilitating judgments made by a user.

According to the present invention, the foregoing objects are attained by providing an approximate reasoning apparatus comprising degree-of-membership computing means for converting inputted data into degree of membership using a membership function, dynamic information quantity computing means for obtaining a dynamic information quantity for every factor using this degree of membership, and possibility computing means for obtaining the possibility of a conclusion using the degree of membership and the dynamic information quantity.

In accordance with the present invention, the possibility of a conclusion is obtained upon including a more accurate dynamic information quantity at a point in time at which data is inputted, with regard to a factor used in reasoning. This enables results of reasoning having a high identification capability to be obtained.

According to another aspect of the present invention, the foregoing objects are attained by providing an apparatus for outputting clarity for approximate reasoning, comprising static information quantity computing means for computing a static information quantity of each factor, clarity computing means for computing the clarity of each factor for every conclusion using the computed static information quantities, clarity adding means for computing the clarity of a factor, for which data has actually been inputted, using the clarity obtained from the clarity computing means, and clarity display means for displaying clarity with regard to results of reasoning obtained from the clarity adding means.

In accordance with the present invention, the clarity of the results of reasoning regarding factors is displayed by the arrangement described above. Accordingly, by observing the clarity, a user is capable of judging whether other factors should be used additionally and whether reasoning should be performed again with regard to results of reasoning.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

(1) Overall Construction of the Approximate Reasoning Apparatus

Figure 1:
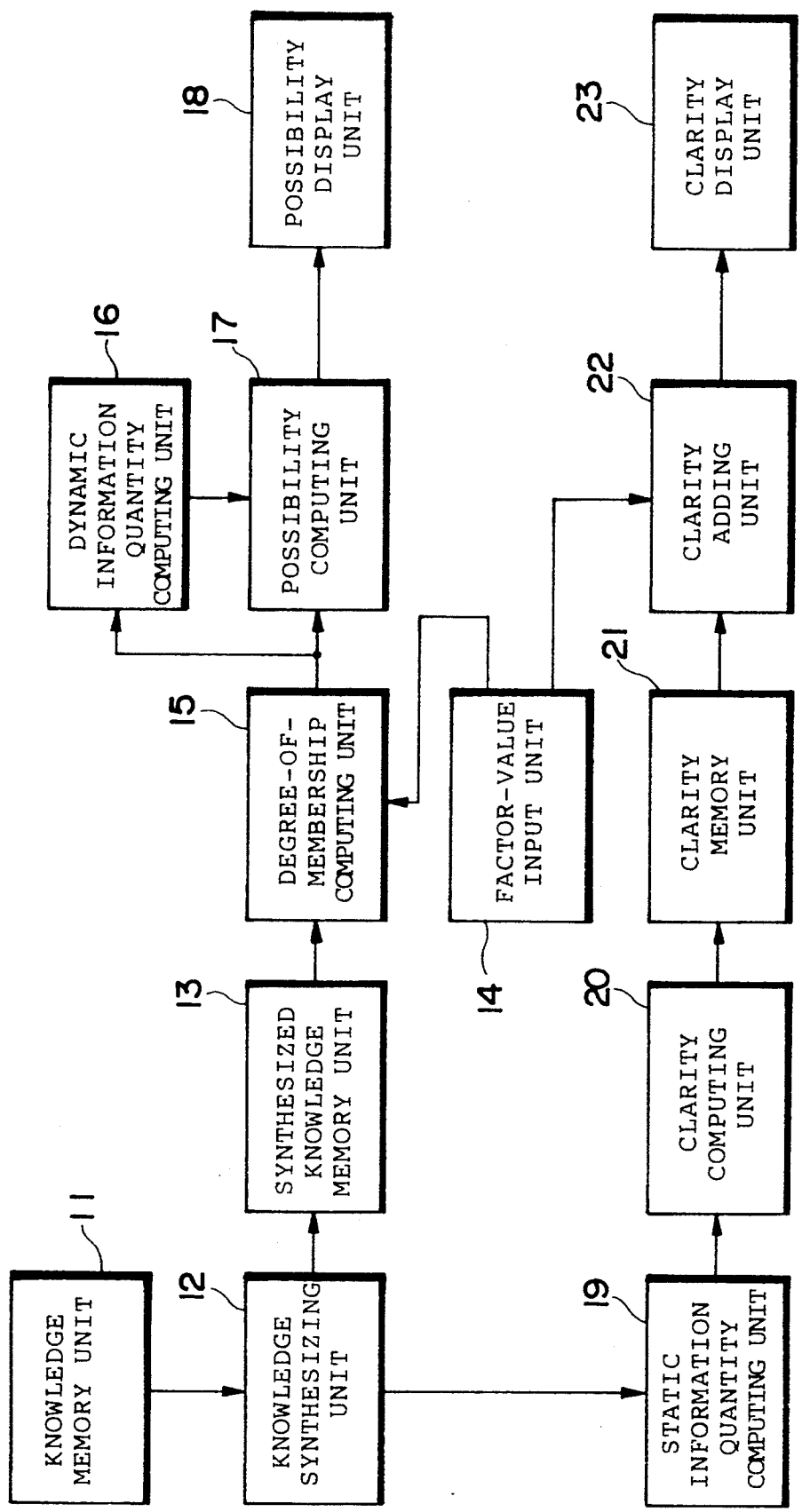
FIG. 1 is a block diagram illustrating an example of the overall construction of an approximate reasoning apparatus.

FIG. 1 is a block diagram illustrating an example of the overall construction of an approximate reasoning apparatus. The approximate reasoning apparatus comprises a knowledge memory unit 11, a knowledge synthesizing unit 12, a synthesized knowledge memory unit 13, a factor-value input unit 14, a degree-of-membership computing unit 15, a dynamic information quantity computing unit 16, a possibility computing unit 17, a possibility display unit 18, a static information quantity computing unit 19, a clarity computing unit 20, a clarity memory unit 21, a clarity adding unit 22, and a clarity display unit 23.

These units will now be described in detail.

(2) Knowledge Memory Unit

The knowledge memory unit 11 stores knowledge, which has been inputted by an expert or the like, in a form which indicates the relationship between factors and a conclusion. This unit is capable of storing the knowledge of a plurality of experts.

Examples of the knowledge of two experts $ex_1$, $ex_2$ stored in the knowledge memory unit 11 are illustrated below in the form of rules.

Expert $ex_1$

If $20 \leq f_1 \leq 60, 0 \leq f_2 \leq 40$, then $c_1$ (1)

If $40 \leq f_1 \leq 80, 60 \leq f_2 \leq 100$, then $c_2$ (2)

Expert $ex_2$

If $30 \leq f_1 \leq 50, 10 \leq f_2 \leq 30$, then $c_1$ (3)

If $50 \leq f_1 \leq 70, 70 \leq f_2 \leq 90$, then $c_2$ (4)

Here $f_1$ and $f_2$ are factors, which shall be referred to as factor 1 and factor 2, respectively, hereinafter. Further $c_1$ and $c_2$ are conclusions, which shall be referred to as conclusion 1 and conclusion 2, respectively.

Further, a, b expressed such that $a \leq f1 \leq b$ holds shall be referred to as minimum and maximum values, respectively, hereinafter.

The foregoing rules become as follows for each expert when expressed in the form of a table:

TABLE 1

EXPERT $ex_1$

| | CONCLUSION | | | |
|---|---|---|---|---|
| | $C_1$ | | $C_2$ | |
| FACTOR | MIN-IMUM VALUE | MAX-IMUM VALUE | MIN-IMUM VALUE | MAX-IMUM VALUE |
| f1 | 20 | 60 | 40 | 80 |
| f2 | 0 | 40 | 60 | 100 |

TABLE 2

EXPERT $ex_2$

| | CONCLUSION | | | |
|---|---|---|---|---|
| | $C_1$ | | $C_2$ | |
| FACTOR | MIN-IMUM VALUE | MAX-IMUM VALUE | MIN-IMUM VALUE | MAX-IMUM VALUE |
| f1 | 30 | 50 | 50 | 70 |
| f2 | 10 | 30 | 70 | 90 |

(3) Knowledge Synthesizing Unit

The knowledge synthesizing unit 12 combines the knowledge of the plurality of experts, which has been stored in the knowledge memory unit 11, into a single body of knowledge.

Though there are various methods of synthesizing knowledge, here the average value and standard deviation of a plurality of experts are calculated with regard to the maximum and minimum values of each factor participating in each conclusion.

Knowledge synthesizing processing will now be described taking as an example knowledge which derives the conclusion $c_1$ from the factor $f_1$ of the two experts mentioned above.

When rules for obtaining conclusion 1 ($c_1$) from factor 1 ($c_1$) are extracted from the above-mentioned rules [Eq. (1) and Eq. (3)], they are expressed as follows:

Expert $ex_1$: if $20 \leq f_1 \leq 60$ then $c_1$ (5)

Expert $ex_2$: if $30 \leq f_1 \leq 50$ then $c_1$ (6)

The average value $m_{min}$ of the minimum values and the average value $m_{max}$ of the maximum values are calculated.

$$m_{min} = \frac{20 + 30}{2} = 25 \quad (7)$$

$$m_{max} = \frac{60 + 50}{2} = 55 \quad (8)$$

The standard deviation $\sigma_{min}$ of the minimum values and the standard deviation $\sigma_{max}$ of the maximum values are calculated.

$$\sigma_{min} = \left( \frac{20^2 + 30^2}{2} - m_{min}^2 \right)^{\frac{1}{2}} = 5 \quad (9)$$

$$\sigma_{max} = \left( \frac{60^2 + 50^2}{2} - m_{max}^2 \right)^{\frac{1}{2}} = 5 \quad (10)$$

When such processing for combining the knowledge of the experts is carried out for all minimum and maximum values of each factor participating in each conclusion with regard to the above-mentioned rules [Eqs. (1) through (4)], the following table is obtained:

TABLE 3

| | CONCLUSION | | | | | | | |
|---|---|---|---|---|---|---|---|---|
| | $C_1$ | | | | $C_2$ | | | |
| | MINIMUM VALUE | | MAXIMUM VALUE | | MINIMUM VALUE | | MAXIMUM VALUE | |
| FACTOR | AV. VALUE | STAND. DEV. | AV. VALUE | STAND. DEV. | AV. VALUE | STAND. DEV. | AV. VALUE | STAND. DEV. |
| f1 | 25 | 5 | 55 | 5 | 45 | 5 | 75 | 5 |
| f2 | 5 | 5 | 35 | 5 | 65 | 5 | 95 | 5 |

Generally, in approximate reasoning, a membership function is given for factor. As one example, a method will be described in which a membership function is obtained by a Gaussian distribution using the knowledge of experts combined as set forth above.

A membership function is expressed the following equation using the average value $m_{min}$ of minimum values, the average value $m_{max}$ of maximum values, the standard deviation $\sigma_{min}$ of minimum values and the standard deviation $\sigma_{max}$ of maximum values:

$$\Phi(x) = \text{Gauss}\left(\frac{x_{min}^{-m}}{\sigma_{min}}\right) - \text{Gauss}\left(\frac{x_{max}^{-m}}{\sigma_{max}}\right) \quad (11)$$

where x : value of data inputted to factor $\phi(x)$ : degree to which input data belongs to factor (degree of membership)

Gauss (x) : value of Gaussian distribution in input x

Figure 2:
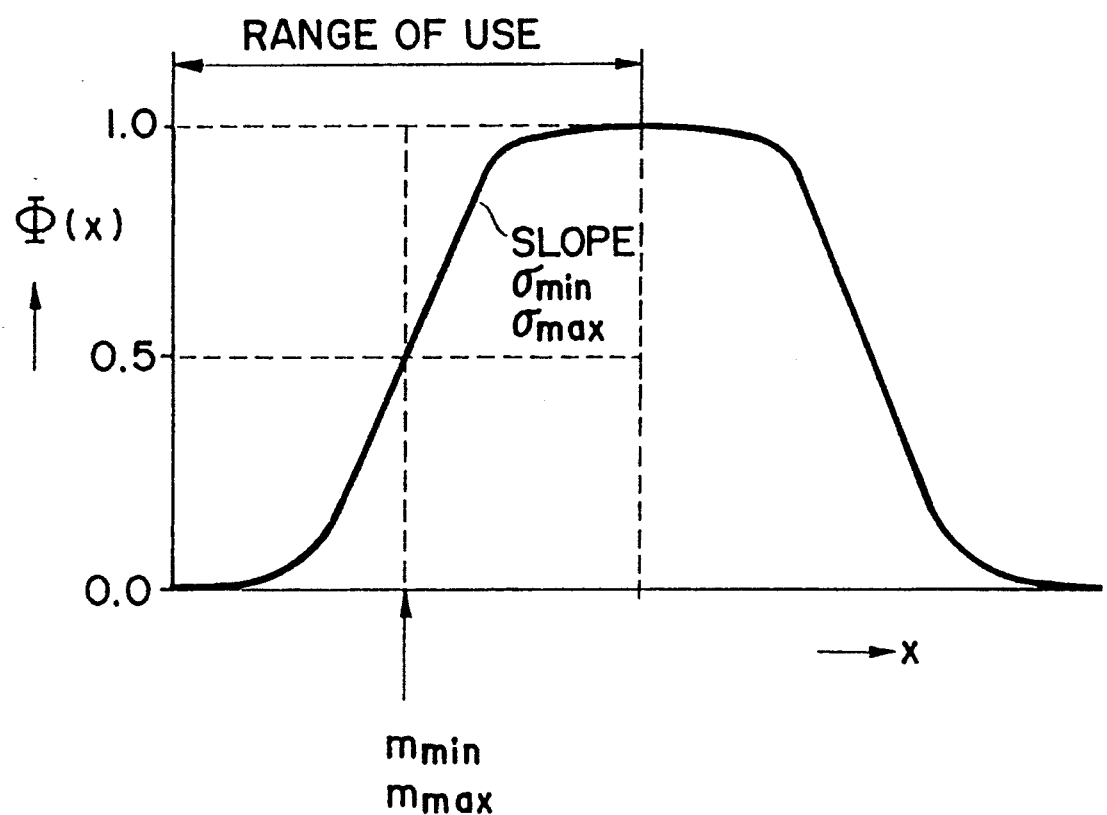
FIG. 2 is a graph depicting a Gaussian distribution.

FIG. 2 illustrates an example of a Gaussian distribution. In this Gaussian distribution, only the left half is used in order to form the membership function. The position of x in $\phi(x) = 0.5$ is decided by $m_{min}$ or $m_{max}$, and the slope is decided by $\sigma_{min}$ or $\sigma_{max}$.

Figure 3A:
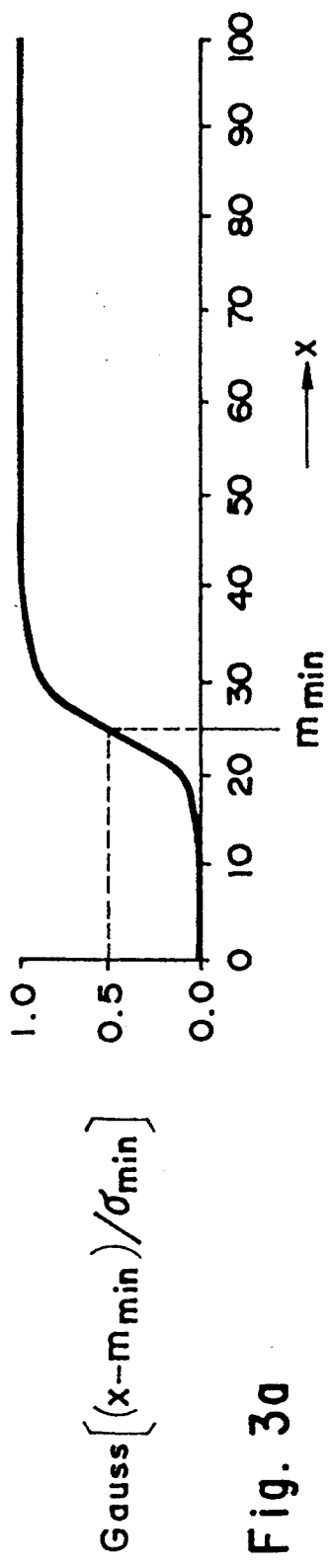
FIGS. 3a through 3c are graphs showing the manner in which a membership function is formed.
Figure 3B:
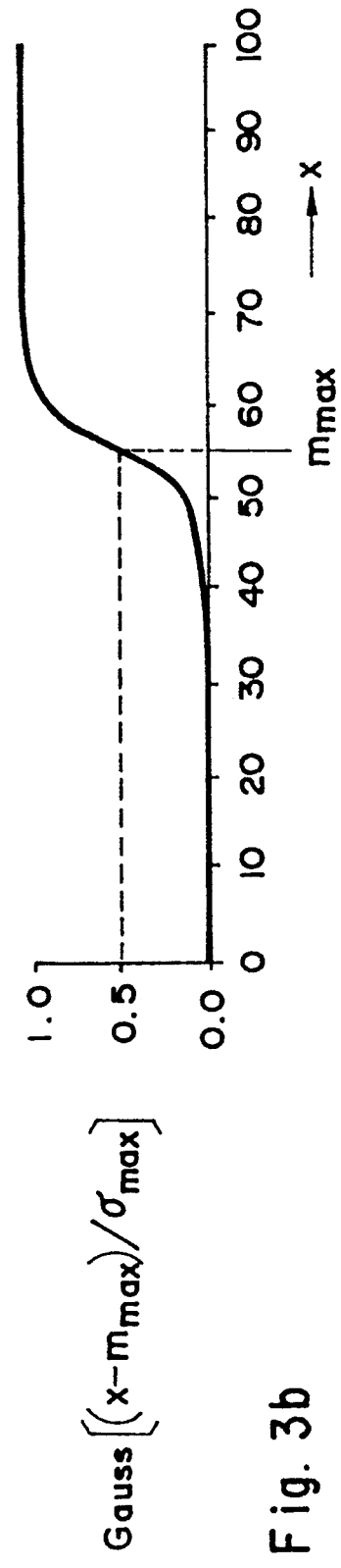
Figure 3C:
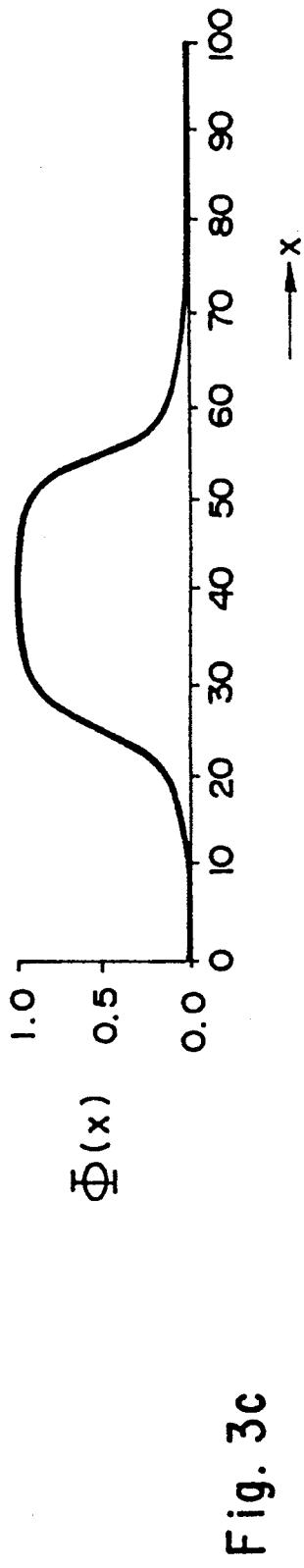

As one example, a membership function for obtaining the conclusion $c_1$ from factor $f_1$ is formed as in the manner of FIG. 3c from FIG. 3a using a value calculated from Eq. (7) to Eq. (10). In this case, Eq. (11) becomes as follows:

$$\Phi(x) = \text{Gauss}\left(\frac{x - 25}{5}\right) - \text{Gauss}\left(\frac{x - 55}{5}\right) \quad (12)$$

FIG. 3a represents the first term on the right side of Eq. (11) or (12), FIG. 3b represents the second term on the right side of Eq. (11) or (12), and FIG. 3c represents the result of subtracting the second term from the first term, namely a membership function expressed by Eq. (11) or (12).

Figure 4A:
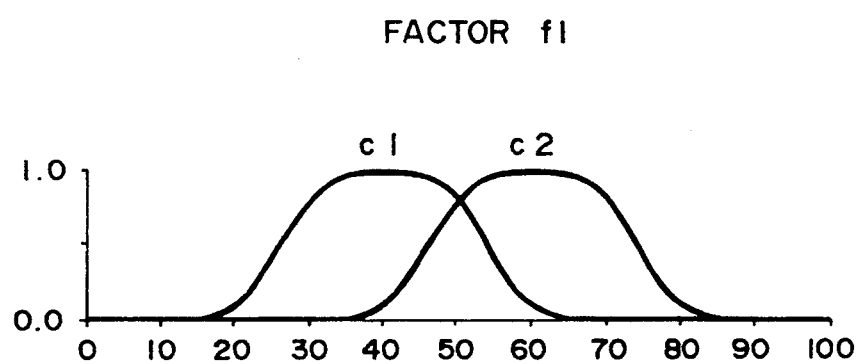
FIGS. 4a and 4b are graphs illustrating membership functions obtained for each factor.
Figure 4B:
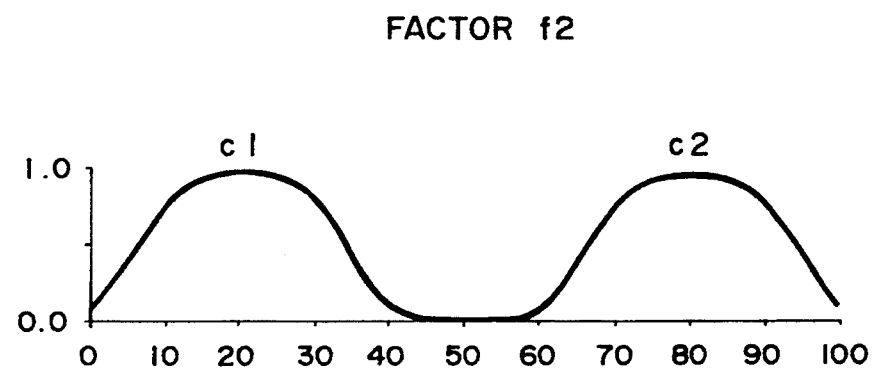

FIGS. 4a and 4b illustrate examples of membership functions for obtaining the conclusions $c_1$, $c_2$ with regard to the factors $f_1$, $f_2$ formed based upon the combined knowledge shown in Table 3.

(4) The Synthesized Knowledge Memory Unit 13

The synthesized knowledge memory unit 13 stores the average values and standard deviation values, which have been calculated by the knowledge synthesizing unit 12, in the form shown in Table 3. Since the synthesizing of knowledge is not required to be carried out whenever reasoning is performed, the calculated are thus stored in advance. Then, by reading out the values from the memory unit 13 and using them whenever reasoning is performed, reasoning processing can be executed at high speed.

(5) Factor-Value Input Unit

The factor-value input unit 14 is for reading in input data, which is entered for every factor, from a keyboard, a communication interface device, a memory, a file, etc. The inputted data is applied to the degree-of-membership computing unit 15. In addition, the factor-value input unit 14 provides the clarity adding unit 22 with information indicating whether data relating to each factor has been entered.

(6) Degree-Of-Membership Computing Unit

The degree-of-membership computing unit 15 calculates the degree to which the data inputted from the factor-value input unit 14 belongs to each membership function (or conclusion). More specifically, the degree of membership is obtained as $\phi(x)$ by substituting the input data as the variable x on the right side of Eq. (11).

Of course, it is not absolutely necessary to use an arithmetic expression of this kind.

(7) Dynamic Information Computing Unit and Static Information Computing Unit Let $x_1$ represent the factor value (input data) of factor $f_1$, and let $x_2$ represent the factor value of factor $f_2$. These items of data are inputted from the factor-value input unit 14.

Figure 5A:
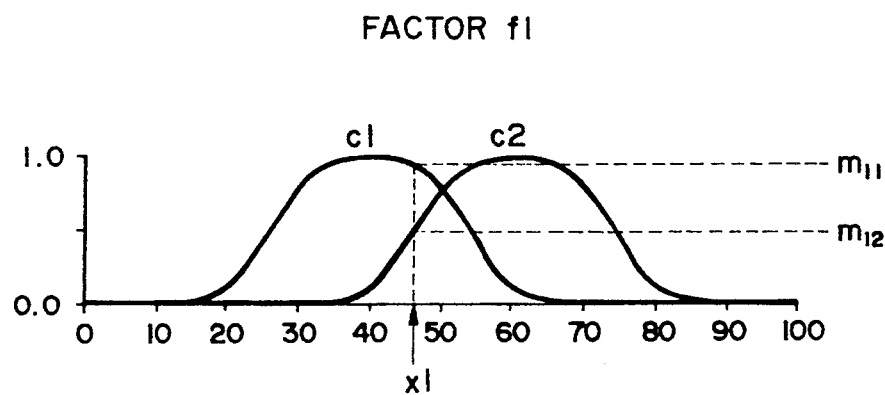
FIGS. 5a and 5b are graphs illustrating the manner in which degree of membership is obtained.
Figure 5B:
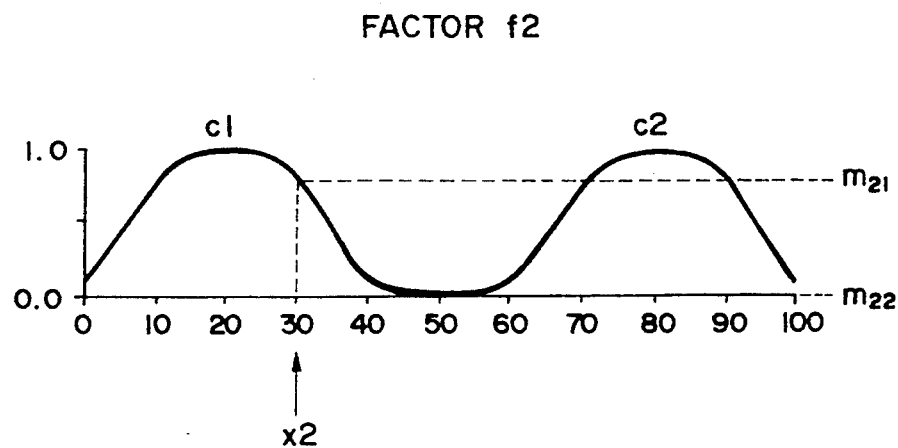

Degrees of membership $m_{11}$, $m_{12}$, $m_{21}$, $m_{22}$ are decided as follows, as shown in FIGS. 5a and 5b:

$m_{11}$: degree of membership of input data $x_1$ in conclusion $c_1$ $m_{12}$: degree of membership of input data $x_1$ in conclusion $c_2$ $m_{21}$: degree of membership of input data $x_2$ in conclusion $c_1$ $m_{22}$: degree of membership of input data $x_2$ in conclusion $c_2$ These degrees of membership are calculated by the degree-of-membership computing unit 15 when the items of input data $x_1$, $x_2$ are applied thereto.

The concept of fuzzy entropy will now be considered.

Fuzzy entropy Ef1 when the input $x_1$ is applied is defined as follows:

$$Ef1 = -\frac{m_{11}}{m_{11} + m_{12}} \log\left(\frac{m_{11}}{m_{11} + m_{12}}\right) \quad (13)$$
$$- \frac{m_{12}}{m_{11} + m_{12}} \log\left(\frac{m_{12}}{m_{11} + m_{12}}\right)$$

Fuzzy entropy is a type of index of information identification capability. The greater the clarity with which a conclusion can be identified when the input data $x_1$ is applied, the smaller the value of fuzzy entropy. Conversely, the greater the degree of ambiguity involved in identifying a conclusion, the larger the value of fuzzy entropy becomes. In other words, the greater the difference between the degree of membership $m_{11}$ of the input data $x_1$ in the conclusion $c_1$ and the degree of membership $m_{12}$ of the input data $x_1$ in the conclusion $c_2$, the smaller the value of fuzzy entropy; the smaller the difference, the greater the value of fuzzy entropy.

Similarly, fuzzy entropy Ef2 when the input $x_2$ is applied is given by the following equation:

$$Ef2 = -\frac{m_{21}}{m_{21} + m_{22}} \log\left(\frac{m_{21}}{m_{21} + m_{22}}\right) \quad (14)$$
$$- \frac{m_{22}}{m_{21} + m_{22}} \log\left(\frac{m_{22}}{m_{21} + m_{22}}\right)$$

The range of possible values of fuzzy entropy Ef is as follows:

$$0 \leq Ef \leq \log(n)$$

n: number of conclusions in terms of factors

In this example, the number of conclusions in terms of factor 1 ($f_1$) is two ($c_1$, $c_2$), and therefore the maximum value of fuzzy entropy Ef is log (2).

Next, a dynamic information quantity $lf_{1D}(x_1)$ which prevails when the input data $x_1$ is applied is obtained using fuzzy entropy Ef1. Here the dynamic information quantity $lf_{1D}(x_1)$ is the identification capability of a factor for deciding a conclusion when reasoning is performed. The Greater the difference between the degree of membership $m_{11}$ of the input data $x_1$ in the conclusion $c_1$ and the degree of membership $m_{12}$ of the input data $x_1$ in the conclusion $c_2$, the larger the value of the dynamic information quantity; the smaller the difference, the smaller the value of the dynamic information quantity.

The dynamic information quantity $lf_{1D}(x_1)$ regarding the factor $f_1$ is defined as the result obtained by subtracting the fuzzy entropy Ef1, which prevails when the input data $x_1$ is applied, from the maximum fuzzy entropy.

$$lf_{1D}(x_1) = \log(2) + \left\{ \frac{m_{11}}{m_{11}+m_{12}} \log\left(\frac{m_{11}}{m_{11}+m_{12}}\right) + \frac{m_{12}}{m_{11}+m_{12}} \log\left(\frac{m_{12}}{m_{11}+m_{12}}\right) \right\} \quad (15)$$

Similarly, the dynamic information quantity which prevails when the input data $x_2$ is applied is as follows, with regard to the factor $f_2$:

$$lf_{2D}(x_2) = \log(2) + \left\{ \frac{m_{21}}{m_{21}+m_{22}} \log\left(\frac{m_{21}}{m_{21}+m_{22}}\right) + \frac{m_{22}}{m_{21}+m_{22}} \log\left(\frac{m_{22}}{m_{21}+m_{22}}\right) \right\} \quad (16)$$

The dynamic information quantity computing unit 16 calculates the dynamic information quantity for every factor, in accordance with Eqs. (15) and (16), using the degrees of membership obtained by the degree-of-membership calculating unit 15.

The dynamic information quantity depends upon the input data $x_1$, $x_2$, as mentioned above. On the other hand, a static information quantity is independent of the input data. The result obtained by subtracting the average of fuzzy entropies within the range of a factor from the maximum fuzzy entropy shall be the static information quantity of the entire factor. For example, the static information quantity with regard to factor 1 is given by the following equation:

$$lf_{1S} = \quad (17)$$

$$\log(2) + \left[ \sum_{x=1}^{100} \left\{ \frac{m_{11}(x)}{m_{11}(x)+m_{12}(x)} \log\left(\frac{m_{11}(x)}{m_{11}(x)+m_{12}(x)}\right) + \frac{m_{12}(x)}{m_{11}(x)+m_{12}(x)} \log\left(\frac{m_{12}(x)}{m_{11}(x)+m_{12}(x)}\right) \right\} \right] / 100$$

Similarly, the static information quantity with regard to factor 1 is given by the following equation:

$$lf_{2S} = \quad (18)$$

$$\log(2) + \left[ \sum_{x=1}^{100} \left\{ \frac{m_{21}(x)}{m_{21}(x)+m_{22}(x)} \log\left(\frac{m_{21}(x)}{m_{21}(x)+m_{22}(x)}\right) + \frac{m_{22}(x)}{m_{21}(x)+m_{22}(x)} \log\left(\frac{m_{22}(x)}{m_{21}(x)+m_{22}(x)}\right) \right\} \right] / 100$$

where $m_{11}$ (x): degree of membership of input data x in conclusion $c_1$ with regard to factor $f_1$ $m_{12}$ (x): degree of membership of input data x in conclusion $c_2$ with regard to factor $f_1$ $m_{21}$ (x): degree of membership of input data x in conclusion $c_1$ with regard to factor $f_2$ $m_{22}$ (x): degree of membership of input data x in conclusion $c_2$ with regard to factor $f_2$ $$\left[ \sum_{x=1}^{100} \ldots \right] / 100 :$$

calculation for varying x at an interval $\delta$ in the range 0-100 of the factor, computing fuzzy entropy for each x, and obtaining the average of these entropies (where $0 < \delta \leq 100$)

As will be understood from Eqs. (17) and (18), the greater the overlapping between membership functions of factors, the smaller the static information quantities of factors. Conversely, the smaller the overlapping between membership functions of factors, the greater the static information quantities of factors. In other words, the static information quantity indicates the capability of a membership function of a factor to identify a conclusion.

The static information quantity computing unit 19 computes and stores a static information quantity for every factor, in accordance with Eqs. (17) and (18), from membership functions obtained by combined knowledge. The static information quantity is independent of input data and therefore need be computed only once.

(8) Possibility Computing Unit

For each and every conclusion, an information quantity of a factor is calculated such that the sum total of information quantities of factors participating in the conclusion becomes 1 and the relative strengths of the information quantities of these factors do not change. This calculated information quantity is referred to as weighting.

For example, when the above-described dynamic information quantities are used, each weighting is as follows:

Weighting of factor 1 with respect to conclusion 1:

$$wf_{11} = lf_{1D}(x_1)/[lf_{1D}(x_1) + lf_{2D}(x_2)] \quad (19)$$

Weighting of factor 2 with respect to conclusion 1:

$$wf_{12} = lf_{2D}(x_2)/[lf_{1D}(x_1) + lf_{2D}(x_2)] \quad (20)$$

Weighting of factor 1 with respect to conclusion 2:

$$wf_{21} = lf_{1D}(x_1)/[lf_{1D}(x_1) + lf_{2D}(x_2)] \quad (21)$$

Weighting of factor 2 with respect to conclusion 2:

$$wf_{22} = lf_{2D}(x_2)/[lf_{1D}(x_1)+lf_{2D}(x_2)] \quad (22)$$

Next, the products of these weightings and degrees of memberships are computed, these are totaled for every conclusion, and the result is outputted as the possibility of a conclusion.

For instance, in the above example, we have the following:

$$\text{Possibility of conclusion 1: } wf_{11} \times m_{11} + wf_{12} \times m_{21} \quad (23)$$

$$\text{Possibility of conclusion 2: } wf_{21} \times m_{12} + wf_{22} \times m_{22} \quad (24)$$

The possibility computing unit 17 performs the foregoing computations and calculates the possibility of every conclusion.

(9) Possibility Display Unit

The possibility display unit 18 displays, for every conclusion, the possibility computed by the possibility computing unit 17. The display of possibility can be presented for all conclusions, or one or a plurality of possibilities can be displayed for a conclusion or conclusions for which the possibility is high. In addition, possibilities can be transmitted to another apparatus by communication or stored in a memory or file.

(10) Clarity Computing Unit

The clarity computing unit 20 computes the clarity of each factor for each and every conclusion. Here the clarity of each factor for each and every conclusion is taken to be an indication of the relative identification capability of each factor when a certain conclusion is decided. Accordingly, the identification capabilities of a plurality of factors for deciding a certain conclusion can be compared depending upon clarity so that which factor possesses a high identification capability (i.e., which factor possesses a large quantity of information) can be understood. A method of calculating clarity will now be described.

First, the relationship among conclusions, factors and static information quantities is shown in Table 4.

TABLE 4

| FACTOR | CONCLUSION | |
|---|---|---|
| | c1 | c2 |
| $f_1$ | $lf_{1S}$ | $lf_{1S}$ |
| $f_2$ | $lf_{2S}$ | $lf_{2S}$ |
| TOTAL | $lf_{1S} + lf_{2S}$ | $lf_{1S} + lf_{2S}$ |

As will be understood from Table 4, the identification capabilities of a plurality of factors for deciding each conclusion can be compared depending upon static information quantities as well. However, since relative identification capability is difficult to grasp intuitively in this form, the static information quantity is normalized for each and every conclusion, as shown in the following table, and the normalized value is adapted as clarity Cl of each factor for each and every conclusion.

TABLE 5

| FACTOR | CONCLUSION | |
|---|---|---|
| | c1 | c2 |
| $f_1$ | $Cl_{11}$ | $Cl_{12}$ |
| $f_2$ | $Cl_{21}$ | $Cl_{22}$ |

TABLE 5-continued

| FACTOR | CONCLUSION | |
|---|---|---|
| | c1 | c2 |
| TOTAL | 1 | 1 |

In Table 5, we have $$Cl_{11} = Cl_{12} = lf_{1S}/(lf_{1S}+lf_{2S})$$

$$Cl_{21} = Cl_{22} = lf_{2S}/(lf_{1S}+lf_{2S})$$

Thus, in the clarity computing unit 20, the clarity of each factor is calculated for each and every conclusion.

(11) Clarity Memory Unit

The clarity memory unit 21 stores the clarity of each factor for every conclusion calculated by the clarity computing unit 20. The computation of clarity need not be performed each time reasoning is carried out. Accordingly, the clarity calculated is stored in the clarity memory unit 21 in advance when knowledge is combined, and a value that has been stored in the clarity memory unit 21 is read out whenever reasoning is executed. This makes it possible to achieve high-speed reasoning processing.

(12) Clarity Adding Unit

The clarity adding unit 22 calculates the clarity of a factor for which data has actually been inputted. Here, for the sake of reasoning actually carried out, the sum total of clarities of factors for which data has been inputted is calculated. The sum total of clarities indicates the clarity of the result of reasoning. It can be said that the greater the clarity, the greater the information quantity for deriving the result of reasoning. Accordingly, clarity can be used as an index for judging the reliability of the result of reasoning itself.

Clarity regarding the result of reasoning is calculated as follows:

a) In a case where data is inputted with regard to only factor 1 ($f_1$)

clarity regarding results of reasoning of of conclusion 1 ($c_1$): $Cl_1 = Cl_{11}$ clarity regarding results of reasoning of of conclusion 2 ($c_2$): $Cl_2 = Cl_{12}$ b) In a case where data is inputted with regard to only factor 2 ($f_2$)

clarity regarding results of reasoning of of conclusion 1 ($c_1$): $Cl_1 = Cl_{21}$ clarity regarding results of reasoning of of conclusion 2 ($c_2$): $Cl_2 = Cl_{22}$ c) In a case where data is inputted with regard to both factor 1 ($f_1$) and factor 2 ($f_2$)

clarity regarding results of reasoning of of conclusion 1 ($c_1$): $Cl_1 = Cl_{11} + Cl_{21} = 1.0$ clarity regarding results of reasoning of of conclusion 2 ($c_2$): $Cl_2 = Cl_{12} + Cl_{22} = 1.0$ Thus the range of possible values of clarity Cl of results of reasoning is $$0.0 \leq Cl \leq 1.0$$

In other words, in a case where reasoning is performed upon entering data regarding all factors capable of being used to deduce a certain conclusion in a body of knowledge given before reasoning is carried out, the clarity of the conclusion will be 1.0. In a case where data is inputted with regard to only some factors among the factors capable of being used to deduce a certain conclusion, clarity takes on a value between 0.0 and 1.0. If many factors having a high degree of clarity among the usable factors are employed in such case, the clarity of the conclusion also will be high and the results of reasoning will have a high reliability.

(13) Clarity Display Unit

The clarity display unit 23 displays the clarity of the results of reasoning (one example of which is possibility, described above) calculated by the clarity adding unit 22. Clarity can be displayed along with the results of reasoning. Alternatively, clarity can be transmitted to another apparatus or stored in a memory or file.

The display of clarity is presented with regard to all conclusions of the results of reasoning. Accordingly, in a case where a plurality of conclusions exists, the clarity corresponding to each conclusion is displayed.

Thus, whenever data is inputted, the information quantity of a factor to which the inputted data belongs is calculated and the clarity regarding the results reasoning is displayed, thereby making it possible for the user to judge the reliability of the results of reasoning.

It goes without saying that the units 11–23 described above can be realized by a computer which includes a memory and a display unit. For example, the knowledge synthesizing unit 12 and the various computing units 15, 16, 17, 19, 20, 22 are realized ideally by a CPU which operates in accordance with a program.

As many apparently widely different embodiments of the present invention can be made without departing from the spirit and scope thereof, it is to be understood that the invention is not limited to the specific embodiments thereof except as defined in the appended claims.

What is claimed is:

1. An approximate reasoning apparatus comprising:
   a knowledge memory for storing relationships between factors and conclusions expressed as membership functions;
   a knowledge synthesizing unit for combining said membership functions which express identical factors and conclusions as synthesized membership functions;
   a degree-of-membership computing unit which converts inputted data into values representing the degrees of membership which inputted data has to said synthesized membership functions;
   a dynamic information quantity computing unit which determines a dynamic information quantity, which is the identification capability of a factor in deciding a conclusion, for every factor using said degrees of membership values; and
   a possibility computing unit for determining a possibility of a conclusion using said degrees of membership values and said dynamic information quantities.

2. The apparatus according to claim 1, further comprising:
   a static information quantity computing unit which determines a static information quantity of each factor using said membership functions, said static information quantity representing the capability of a membership function of a factor to identify a conclusion;
   a clarity computing unit for determining a clarity value of each factor for every conclusion using the determined static information quantities;
   a clarity memory for storing said clarity value of each factor for every conclusion;
   a clarity adding means for determining a clarity with regard to the results of reasoning using the clarity values stored in said clarity memory for each factor for which data has actually been inputted; and
   a clarity display unit for displaying said clarity with regard to results of reasoning obtained from said clarity adding means.

3. An apparatus for outputting a clarity for an approximate reasoning apparatus, comprising:
   a knowledge memory for storing relationships between factors and conclusions expressed as membership functions;
   a knowledge synthesizing unit for combining said membership functions which express identical factors and conclusions as synthesized membership functions;
   a static information quantity computing unit which determines a static information quantity of each factor with respect to said synthesized membership functions used in said approximate reasoning, said static information quantity representing the capability of a membership function of a factor to identify a conclusion;
   a clarity computing unit which determines a clarity value for each factor for every conclusion using the determined static information quantities;
   a clarity memory for storing said clarity values of each factor for every conclusion;
   a clarity adding means for determining a clarity with regard to results of reasoning using the clarity values stored in said clarity memory for each factor for which data has actually been inputted; and
   a clarity display unit for displaying said clarity with regard to results of reasoning obtained from said clarity adding means.

* * * * *